United States Patent [19]

Lurie

[11] 4,202,869

[45] May 13, 1980

[54] PROCESS FOR THE DESULFURIZATION OF FLUE GASES

[76] Inventor: David Lurie, 539 Covington Pl., Wyckoff, N.J. 07481

[21] Appl. No.: 904,329

[22] Filed: May 9, 1978

Related U.S. Application Data

[62] Division of Ser. No. 688,133, May 20, 1976, Pat. No. 4,134,961.

[51] Int. Cl.$^2$ ............... C01B 17/16; C01B 17/02; C01F 7/02
[52] U.S. Cl. ............................ 423/563; 423/571; 423/600
[58] Field of Search ............ 423/571, 561 A, 562, 423/563, 600, 642

[56] References Cited

U.S. PATENT DOCUMENTS

| 3,574,545 | 4/1971 | Grantham | 423/563 |
| 3,635,666 | 1/1971 | Fujioka | 423/562 |

OTHER PUBLICATIONS

Bienstock et al., Process Development in Removing Sulfur Dioxide from Hot Flue Gases, Bureau of Mines Inv. 5735, 1961.

*Primary Examiner*—John H. Mack
*Assistant Examiner*—Gregory A. Heller
*Attorney, Agent, or Firm*—Evans Kahn

[57] ABSTRACT

Flue gas having a content of sulfur dioxide is passed upwardly through a scrubbing tower against a descending flow of recycled aqueous sodium aluminate-sodium hydroxide liquor. The sulfur dioxide in the gas is converted to sodium and aluminum sulfates and sulfites and the liquor removes any fly ash present in the gas. Underflow is continuously discharged from the tower and is sent to an evaporator for removal of excess water. Make-up solutions of sodium hydroxide, sodium sulfate and aluminum sulfate are added, as necessary. Carbonaceous reducing agent is added to the discharge from the evaporator. The mixture is continuously fed into a reducing furnace where the sulfates and sulfites are reduced to sulfides. The product of the furnace (molten sodium and aluminum sulfides) is charged into a continuous hydrolyzer. Hydrogen sulfide is evolved and collected, and, if desired, its sulfur content is converted to elementary sulfur. The underflow from the hydrolyzer is filtered. The filtrate is aqueous sodium aluminate-sodium hydroxide solution which is recycled to the scrubbing tower.

2 Claims, 1 Drawing Figure

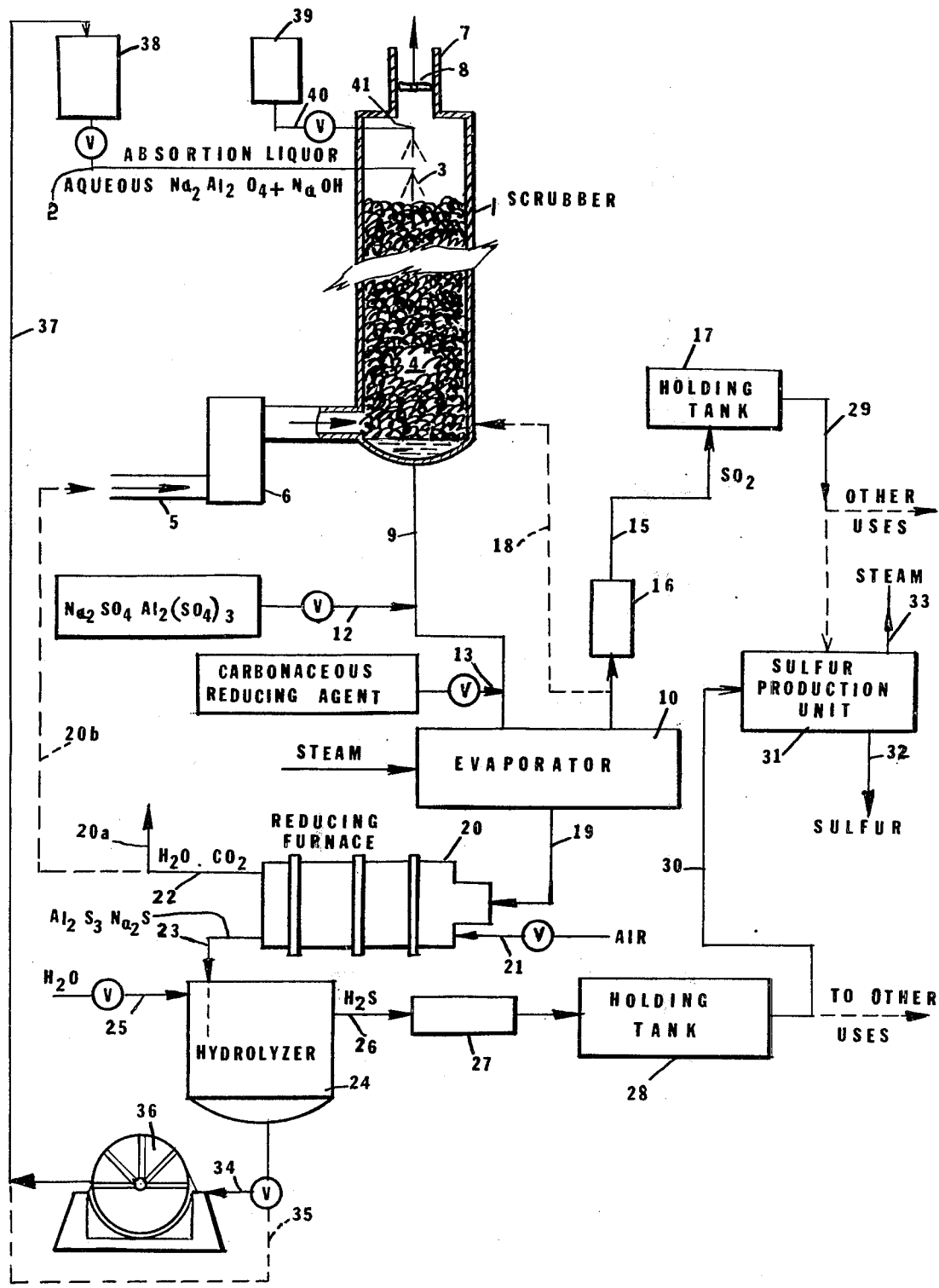

PROCESS FOR THE DESULFURIZATION OF FLUE GASES

This is a division of application Ser. No. 688,133, filed on May 20, 1976, now U.S. Pat. No. 4,134,961.

FIELD OF THE INVENTION

The invention relates to a process for desulfurizing flue gases formed by combustion of sulfur-containing fossil fuels and by the smelting of sulfide ores. The invention includes the process steps themselves and the apparatus therefor.

BACKGROUND OF THE INVENTION

In the United States, the supply of high grade fossil fuels (coal and oil) of low sulfur and of high heat content is approaching exhaustion, and power plant operators and other producers of energy are now turning to high sulfur fuels. However, in the absence of special precautions such fuels generally cannot be burned lawfully in urban areas because they release excessive quantities of sulfur dioxide. Smelters of sulfur-containing ores face similar restraints. National clean air standards limit sulfur dioxide emissions to low values to prevent excessive pollution of the atmosphere.

It is now possible to desulfurize flue gases adequately to meet these standards, but the processes presently used for this purpose are complex and costly; moreover, they generally do not recover the sulfur in economically useful form. Economic recovery of sulfur is an important consideration, because a moderately sized (million kilowatt) electrical power plant operating on coal of moderate (3%) sulfur content of moderate (12,500 B.T.U./lb.) fuel value releases about 480 tons of sulfur dioxide (equivalent to about 240 tons of sulfur) per day.

It has been proposed to desulfurize flue gases by an alkalized alumina process wherein a raw absorbent solid in the form of small spheres of dawsonite [NaAl(CO$_3$)(OH)$_2$] is activated at 1,200° F. to form a high-porosity, high surface area sodium alumina. The dawsonite reacts with the sulfur dioxide in the flue gas to form sulfates which are then converted to aluminates in the presence of a reducing gas at 1,200° F. A process of this type is described in "Control Techniques for Sulfur Oxide Air Pollutants" (U.S. Dept. of Health, Education and Welfare, Washington, D.C., Jan. 1969); see also U.S. Pat. Nos. 3,551,093 and 3,580,702. The process has serious disadvantages in that it requires the formation and use of friable spheres which are difficult to manufacture and which have a comparatively short life, and in that it does not convert the sulfur dioxide gas to compact, inert, easily transportable and high-value form.

OBJECTS OF THE INVENTION

The present invention has as its principal objects:

1. The desulfurization of sulfur dioxide-containing flue gases by a simple and safe process which removes substantially all of the sulfur dioxide content of the gases in a form which permits recovery of the sulfur content thereof in inert, valuable form.

2. The provision of a process for that purpose which does not require costly reagents or catalysts, and which can be operated on a continuous and largely automatic basis in apparatus composed of inexpensive, simple and conventional units.

3. The provision of such a process which does not discharge toxic or noxious products into the environment, and which meets even the most stringent clean air standards.

THE INVENTION

The foregoing objects are substantially attained by the process of the present invention, which is a continuous cyclic process for the desulfurization of sulfur-containing flue gases, which comprises: (1) scrubbing the flue gas with an aqueous recycled sodium aluminate-sodium hydroxide solution thereby removing substantially all of said sulfur dioxide from the gas and converting the solution to an aqueous solution of sodium and aluminum sulfates and sulfites; (2) evaporating at least half of the water in said solution, thereby evolving sulfur dioxide from the solution; (3) collecting the sulfur dioxide; (4) reducing the sulfates and sulfites to sodium and aluminum sulfides; (5) hydrolyzing the sulfides, thereby evolving hydrogen sulfide and forming an aqueous solution of sodium aluminate and sodium hydroxide; (6) collecting said hydrogen sulfide; and (7) recycling the solution of step (5) to said scrubbing step (1).

The foregoing process in substantial part rests on my discovery that substantially pure concentrated gaseous hydrogen sulfide and strong aqueous sodium aluminate-sodium hydroxide solution can be prepared by heating an aqueous 1:1 to 2:1 (Na$_2$O:Al$_2$O$_3$) molar ratio sodium sulfide: aluminum sulfide solution at a temperature above about 30° C. The process also rests on my discovery that this solution of sodium aluminate and sodium hydroxide has excellent absorptive properties for gaseous sulfur dioxide.

I have further discovered a more detailed cyclic process for the desulfurization of sulfur dioxide-containing flue gases containing suspended inorganic particulate matter (e.g., ash or smelter fines), which comprises: (1) scrubbing said flue gas with an aqueous recycled solution containing 15%-35% by weight of sodium aluminate and sodium hydroxide in about 1:1 to 1:2 Al$_2$O$_3$:Na$_2$O molar ratio thereby removing substantially all said sulfur dioxide from said gas, converting said solution into an aqueous solution of sodium and aluminum sulfates and sulfites, and removing any fly ash present; (2) heating said solution, thereby evolving sulfur dioxide from said solution and evaporating at least half the water from said solution; (3) collecting said evolved sulfur dioxide; (4) reducing said sodium and aluminum sulfates and sulfites to sulfides; (5) hydrolyzing said sulfides, thereby evolving hydrogen sulfide and forming an aqueous sodium aluminate-sodium hydroxide solution; (6) collecting said hydrogen sulfide; (7) converting the sulfur content of said hydrogen sulfide to elementary sulfur; (8) filtering if necessary of said aqueous sodium aluminate-sodium hydroxide solution of step (5) thereby removing insoluble inorganic particulate matter, and recycling said filtered or unfiltered solution from step (5) to step (1).

The process of the present invention possesses the following additional special advantages.

1. The only products discharged into the environment from the desulfurization operation are water vapor and carbon dioxide.

2. Substantially all of the sulfur content of the flue gas is recovered in elementary form.

3. The only make-up reagents needed are sodium hydroxide and sodium sulfate, and aluminum sulfate, and the principal consumed reagent is the carbonaceous reducing agent.

4. The process removes substantially all of the fly ash or suspended mineral matter present in the flue gas; the solids are recovered as a filter cake, which need not become an ecological problem.

The process thus opens the way for the efficient and ecologically safe commercial utilization of fossil fuels of high sulfur content.

The present invention will be more particularly explained by reference to the drawing, which is a schematic flow-sheet illustrating the principal items of apparatus which can be used and the principal process steps employed. The invention does not depend on the particular form of apparatus, and recognized equivalents can be employed in place of the specific items of apparatus shown.

The apparatus consists essentially of scrubbing tower 1; evaporator 10 for condensing the underflow from tower 1; reducing furnace 20; hydrolyzer 24; and filter 36, all connected in series, together with associated piping and ductwork as more particularly set forth below. All these items can be of conventional design.

Scrubbing tower 1 is provided with valved absorption liquor supply pipe 2 ending in spray head 3; the tower contains loose packing or baffling 4 for facilitating contact between the scrubbing liquor and the gas. Flue gas inlet duct 5 (containing optional cooler or heat exchanger 6) supplies sulfur dioxide-containing flue gas to tower 1 at a predetermined temperature. Flue gas outlet duct 7, containing exhaust fan 8, discharges the scrubbed gas to the atmosphere.

Pipe 9 conveys spent absorption liquor from tower 1 to evaporator 10. Valved pipe 12 supplies make-up solution from tank 11 into pipe 9 as required. Valved pipe 13 supplies carbonaceous reducing agent from tank 14 into pipe 9 as required. Gas discharge duct 15 conveys volatile products from evaporator 10 through dehydrator 16 into sulfur dioxide holding tank 17; optional by-pass duct 18 permits part or all of said volatile products to be introduced into the bottom of scrubber 1, where they mingle with the starting flue gas, become part of the rising gas stream, and react in the same manner.

Pipe 19 conveys the product from evaporator 10 to reducing furnace 20, which is equipped with valved pipe 21 to admit a regulated volume of air to the furnace.

Duct 22 leads the gaseous products from reducing furnace 20 to flue gas inlet pipe 5. Pipe 23 conveys the underflow from furnace 20 to hydrolyzer 24, which is provided with valved fresh water inlet pipe 25.

Duct 26 conveys the gaseous products from hydrolyzer 24 through dehydrator 27 to hydrogen sulfide holding tank 28.

Ducts 29 and 30, respectively, convey the gaseous products from holding tanks 17 and 28 to such uses as may be desired or, optionally, to sulfur production unit 31 provided with lines 32 and 33 for discharge, respectively, of molten sulfur and steam.

Valved lines 34 and 35 convey the underflow from hydrolyzer 22 through, around or partly through and partly around filter 36 and thence to scrubber 1 via recycled absorption liquor return line 37 and liquor holding tank 38.

Tank 39 supplies sodium hydroxide solution through valved pipe 40 and spray head 41 into an upper portion of scrubber 1.

The apparatus contains pumps and valves, fans, etc., as needed to provide for efficient circulation of the materials employed in and evolved from the process.

In a preferred embodiment of the process of the present invention the sulfur dioxide-containing flue gas (which also typically contains free oxygen and fly ash) flowing through duct 5 is cooled in heat exchanger 6 and enters the bottom of scrubber tower 1. The gas rises through the tower against a downward flow of hot absorbent liquor (a strongly alkaline aqueous solution of sodium aluminate and sodium hydroxide) admitted through spray head 3, and, assisted as necessary by optional fan 8, leaves the tower through duct 7 substantially free of sulfur dioxide and other sulfur gases, and substantially free of fly ash, mineral dust, etc.

As the scrubbing liquor descends through the tower it absorbs any sulfur dioxide which has escaped absorption at a lower level, and the pH of the solution falls from an initial value, which may be as high as 13–14, to lower values, causing a series of complex reactions to occur. At one zone in the tower the aluminum content of the liquor is substantially entirely present in the form of a soft, colloidal gel [aluminum hydrate, $Al(OH)_3$] which absorbs (or adsorbs) sulfur dioxide with great efficiency and which appears to hold the sulfur dioxide in specially easily reactive form.

In its descent the liquor meets increasing concentrations of sulfur dioxide and oxygen in the rising gas; the alumina gel-sulfur dioxide complex interacts under oxidizing conditions and forms a solution of sodium and aluminum sulfates and sulfites. Because of insufficient contact time (or insufficient oxygen, or insufficient surface exposure to oxygen, or a combination of all three,) usually not all the sulfite ions undergo oxidation to sulfate ions while in the tower and as a result a varying quantity of sulfite ions (including bisulfite ions) are present in the tower underflow. These ions do not cause any harm.

The liquor discharged from the tower is thus an aqueous solution of sodium and aluminum sulfates and sulfites, preferably having a temperature above 70° C. and a dissolved solids content of about 25%–35% by weight, and contains whatever fly ash or mineral matter is present in the entering flue gas. This liquor is pumped through line 9 to continuous evaporator 10. In transit, make-up solutions and carbonaceous reducing agent are added through pipes 12 and 13, respectively, as is more particularly set forth below.

In evaporator 10 the mixture is dewatered to as high a solids content as possible while maintaining the liquor of pumpable consistency. The vapors from the evaporator are chiefly water vapor and sulfur dioxide; sulfur dioxide is only slightly soluble in water at the boil and substantially all of it evolves from the liquid. The vapors (essentially water vapor containing a small proportion of sulfur dioxide) are returned to the bottom of tower 1 through duct 18 or, optionally, are passed through dehydrator 16 into sulfur dioxide collecting or holding tank 17 as may be desired.

The concentrated solids from evaporator 10 (an aqueous solution of sodium and aluminum sulfates and sulfites containing ash and, usually, carbonaceous reducing agent) are introduced into continuous rotary reducing furnace 20 together with a regulated air supply to produce a reducing atmosphere and an exit temperature high enough to furnish a molten product. The gas from the furnace (principally water vapor and carbon dioxide) is vented to the atmosphere by duct 20a, unless it contains sulfur dioxide (a frequent contaminant from the reducing agent), in which case it is conveyed to the bottom of tower 1 by optional duct 20b where it mixes with the flue gas.

The underflow from the furnace is essentially a molten mixture of aluminum and sodium sulfides and ash having a temperature of about 1,200° C. The mixture is pumped or allowed to flow by gravity into continuous hydrolyzer 24; water in requisite amount is supplied to the hydrolyzer through pipe 25. The gaseous product of the hydrolyzer is hydrogen sulfide, together with some water vapor, and is pumped through dehydrator 27 and then to holding tank 28.

The underflow from hydrolyzer 24 is an aqueous solution of sodium hydroxide and sodium aluminate, and is suitable for use as absorbent liquor in the process. Part or all is passed through filter 36 to the extent necessary to remove all the solids or maintain the solids at a conveniently low level and is pumped through pipe 37 to holding tank 38 and from there via pipe 2 to spray head 3, completing its cycle.

Tank 39 contains sodium hydroxide solution, which is admitted to tower 1 through spray head 41 (located near the top thereof) as required to adjust the pH of the liquor and to wash from the walls of the tower or from the packing any hydrous alumina gel which may have deposited there.

The hydrogen sulfide from holding tank 28 is reacted with sulfur dioxide to convert its sulfur content to elementary form. The sulfur dioxide may be derived in whole or in part from holding tank 17, or it may be formed by oxidation of a part of the hydrogen sulfide from tank 28.

A preferred method for starting up the process is by filling tank 38 with a hot (70° C.–90° C.) aqueous absorption liquor containing about 15%–35% by weight solution of sodium aluminate and sodium hydroxide in about 1:1.1 $Al_2O_3:Na_2O$ molar ratio, controlling cooler 6 so that the flue gases enter tower 1 at about 100° C., and spraying the liquor at about 70° C.–90° C. from tank 38 through spray head 3 into tower 1 at such rate that the flue gas exiting through duct 7 has a temperature in the range of about 70° C.–90° C. and contains substantially no sulfur dioxide, and so that the underflow from the tower has a pH less than 3 and generally is in the range of 1 to 2. The underflow from the tower preferably has a temperature in excess of 70° C. and a solids content (exclusive of ash) in the range of 25% to 35%. The solids content of the underflow can be controlled conveniently by varying the temperature of the flue gas, which typically has a temperature (before cooling) of 400° C.–500° C.

In the process, the use of aluminum salts where specified is critical, because aluminum is the metal which has the highest combining equivalence for sulfur and is the only industrially available polyvalent metal (i.e., metal which has a valence in excess of 2) the sulfates of which can be reduced to sulfides by commercially practicable means.

The utility of potassium salts as replacements for the sodium salts in the process has not been determined, but no reason is seen why at least part of the sodium salts cannot be replaced by the corresponding salts with satisfactory results.

As the process proceeds, a deficiency of sodium ions slowly develops, most probably as the result of volatilization and adsorption of sodium ions by the ash. The system therefore slowly but steadily decreases in basicity, and unless this is corrected the pH of the recirculated liquor falls and part or all of the aluminum in the initial scrubbing liquor enters the scrubber in the form of aluminum hydrate. This causes a drop in the absorptive capacity of the liquor and a corresponding drop in the efficiency of the system. The deficiency is in immediate need of correction when particles of hydrous alumina appear in the underflow from the tower, or when the underflow from the tower has a pH above 4. This deficiency can be remedied most economically by adding aqueous sodium sulfate to the liquor at a point subsequent to the scrubbing step (1) and prior to reducing step (4), and preferably to the solution in pipe 9. It can also be corrected by adding sodium hydroxide solution through spray head 3 at the top of tower 1.

A deficiency is aluminum ions can be corrected by adding alum (aluminum sulfate) solution to the liquor in pipe 9.

The carbonaceous reducing agent which is employed can be any carbonaceous substance which will cause a reducing reaction in the furnace. Thus it may be ground coke, natural gas or producer gas. Because of its cheapness, I prefer to use an aqueous slurry of powdered bituminous coal; it is also practical to use fuel oil or high-boiling petroleum fractions (which advantageously can be in emulsified state). The amount of reducing agent added should be sufficient to reduce all the salts present to sulfide form and to provide sufficient heat so that the product of the furnace is a fluid melt. The presence of sulfate or sulfite ions in the discharge from the furnace is evidence that the amount of reducing agent is insufficient.

The carbonaceous reducing agent is usually most conveniently added to the absorbent liquor before it enters evaporator 10, but, if desired, the reducing agent can be added to the product from the evaporator or, if preferred, it can be added directly to the furnace.

In evaporator 10 the mixture is dewatered to as high a solids content as can be conveniently pumped after any addition of carbonaceous reducing agent. It is entirely practical to remove half the water present and the mixture is usually of pumpable consistency after about ⅝–¾ of the water has been evaporated.

Preferably, the discharge from evaporator 10 is a pumpable slurry of sodium and aluminum sulfates and sulfites, together with ash and carbonaceous reducing agent, and is preferably pumped directly into reducing furnace 20.

The discharge from reducing furnace 20 is a stream of molten sodium and aluminum sulfides preferably in about 1.1:1 $Na_2O:Al_2O_3$ molar ratio. The slight excess of sodium hydroxide acts as stabilizer for the sodium aluminate formed in the course of subsequent hydrolysis. This stream is pumped or allowed to flow by gravity into hydrolyzer 24, where it is mixed with a regulated supply of water entering through pipe 25 in sufficient amount to provide a discharge which has a temperature of 70° C.–90° C. and which contains about 15%–35% of salts by weight, equivalent to a water: molten salt weight ratio between about 1:5 and 1:2.

The gaseous product from the hydrolyzer is essentially a mixture of water vapor plus hydrogen sulfide having a temperature of about 70° C.–90° C. The mixture is pumped through a dehydrator and the dry, substantially pure hydrogen sulfide is collected in holding tank 27. Thence the gas is passed to sulfur production unit 31 where a part is oxidized to sulfur dioxide and a sulfur dioxide-hydrogen sulfide interaction with production is performed according to the equations:

$$2H_2S + 3O_2 \rightarrow 2SO_2 + 2H_2O$$

$$2H_2S + SO_2 \rightarrow 2H_2O + 3S$$

The first reaction is an ordinary combustion. The second reaction proceeds at 245° C. in the presence of bauxite catalyst (or other suitable catalyst). If desired, a part of the sulfur dioxide may be the sulfur dioxide which is evolved from evaporator 10 and collected in holding tank 17.

The underflow from hydrolyzer 24 passes through vacuum drum filter 36 (or other solids removal means) to remove the ash which is usually present. The resulting clear liquor (a 15%–35% by weight aqueous sodium hydroxide-sodium aluminate 1.1:1 $Na_2O:Al_2O_3$ molar ratio solution) is pumped to holding tank 38, from which it is pumped into scrubber 1 through pipe 2 and spray head 3, thus completing the cycle.

The products of the process which pass into the environment are thus only water vapor, carbon dioxide and ash, and substantially all of the sulfur is recovered in elementary form. The sulfur vapor is condensed to a liquid and run to a storage tank for further disposal.

We claim:

1. A process for the preparation of gaseous hydrogen sulfide and an aqueous sodium aluminate-sodium hydroxide solution, which consists essentially in mixing a fluid molten mixture of aluminum sulfide and sodium sulfide in 1:1 to 1:2 $Al_2O_3:Na_2O$ equivalent molar ratio with a sufficient amount of water to provide a solution having a temperature in excess of about 30° C. and to cause evolution of hydrogen sulfide therefrom.

2. A process according to claim 1 wherein the amount of water is sufficient to provide a solution having a temperature of about 70° C. to 90° C.

* * * * *